US012677014B2

(12) United States Patent　　　　(10) Patent No.:　US 12,677,014 B2
Jeng et al.　　　　　　　　　　　　 (45) Date of Patent:　　　Jul. 7, 2026

(54) HDMI FRL CORRECTION SYSTEM AND METHOD THEREOF

(71) Applicant: MEDIATEK INC., Hsinchu City (TW)

(72) Inventors: You-Tsai Jeng, Hsinchu City (TW); Kai-Wen Yeh, Hsinchu City (TW); Meng-Chung Hsiao, Hsinchu County (TW); Yi-Cheng Chen, Hsinchu City (TW); Kuo-Chang Cheng, Hsinchu City (TW); Chia-Hao Chang, Hsinchu City (TW); Chi-Huan Tang, Hsinchu City (TW); Chen-Yi Liu, Hsinchu City (TW); Chin-Lung Lin, Hsinchu City (TW); Ko-Yin Lai, Hsinchu City (TW); Tai-Lai Tung, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 33 days.

(21) Appl. No.: 18/829,285

(22) Filed: Sep. 10, 2024

(65) Prior Publication Data

US 2026/0075267 A1　　　Mar. 12, 2026

(51) Int. Cl.
　　*H04N 21/23*　　　　(2011.01)
　　*H04N 7/01*　　　　 (2006.01)
　　*H04N 21/235*　　　(2011.01)
　　*H04N 21/24*　　　 (2011.01)
(52) U.S. Cl.
　　CPC ......... *H04N 21/235* (2013.01); *H04N 7/0125* (2013.01); *H04N 21/2404* (2013.01)

(58) Field of Classification Search
None
See application file for complete search history.

(56) References Cited

U.S. PATENT DOCUMENTS

| | | |
|---|---|---|
| 2019/0229968 A1 | 7/2019 | Huang |
| 2022/0109908 A1* | 4/2022 | Chan ............... H04N 21/43635 |
| 2022/0150555 A1* | 5/2022 | Chan ............... H04N 21/43635 |
| 2023/0081552 A1* | 3/2023 | Chou ................... H04B 7/0639 370/329 |
| 2023/0224901 A1* | 7/2023 | Lin ....................... H04W 72/20 370/329 |
| 2023/0403099 A1 | 12/2023 | Li |

FOREIGN PATENT DOCUMENTS

| | | |
|---|---|---|
| TW | 202215855 A | 4/2022 |
| TW | 202220453 A | 5/2022 |

* cited by examiner

*Primary Examiner* — Samira Monshi
(74) *Attorney, Agent, or Firm* — Winston Hsu

(57)　　　　ABSTRACT

An HDMI FRL error correction system includes a SR/SSB correlator, an SR/SSB lock detector coupled to the SR/SSB correlator, an SR/SSB predictor coupled to the SR/SSB lock detector, an SR/SSB bit error corrector coupled to the SR/SSB correlator, the SR/SSB lock detector and the SR/SSB predictor, and an SR/SSB detector coupled to the SR/SSB bit error corrector. The SR/SSB correlator is used to correlate an input SR signal to a SR signal or correlate an input SSB signal to a SSB signal and generate a correlation result accordingly. The SR/SSB lock detector is used to set a lock flag according to the correlation result.

12 Claims, 5 Drawing Sheets

HDMI FRL CORRECTION SYSTEM AND METHOD THEREOF

BACKGROUND

High-Definition Multimedia Interface (HDMI) is a digital interface that transmits uncompressed or compressed video and audio data from a source device (e.g., Blu-ray player or game console) to a display device (e.g., TV or projector). Unlike older analog connections, HDMI provides superior picture and sound quality, making it the go-to standard for modern home theater setups.

Unlike the traditional Transition Minimized Differential Signaling (TMDS) signaling used in earlier HDMI versions, Fixed Rate Link (FRL) is a new signaling mode that transmits data at a fixed rate with dedicated lanes for video, audio, and other channels. This allows for higher data throughput and better handling of high-resolution video and audio formats.

HDMI FRL is a feature of HDMI 2.1 that enables higher bandwidth and resolutions for video and audio signals. FRL stands for Fixed Rate Link, which means that the data is transmitted at a constant rate regardless of the content. FRL supports up to 12 Gbps per lane, or 48 Gbps total, allowing for resolutions up to 10K and refresh rates up to 120 Hz. FRL also supports dynamic HDR, eARC, and VRR technologies that enhance the quality and compatibility of HDMI devices.

The Scrambler Reset (SR) and Start of Super Block (SSB) (herein after referred to as "SR/SSB") is a special signal that is used to initialize the scrambler state in HDMI FRL mode. The SR/SSB allows the receiver to synchronize with the transmitter and to verify the integrity of the FRL link.

However, the HDMI specification does not provide any error detection mechanism for the SR/SSB used in synchronization. Bit errors may occur when the signal-to-noise ratio (SNR) is relatively low, causing the HDMI system to not synchronize correctly.

SUMMARY

An embodiment provides a High Definition Multimedia Interface (HDMI) Fixed Rate Link (FRL) system comprising a Scrambler Reset (SR) and Start of Super Block (SSB) (SR/SSB) correlator, an SR/SSB lock detector coupled to the SR/SSB correlator, an SR/SSB predictor coupled to the SR/SSB lock detector, an SR/SSB bit error corrector coupled to the SR/SSB correlator, the SR/SSB lock detector and the SR/SSB predictor, and an SR/SSB detector coupled to the SR/SSB bit error corrector. The SR/SSB correlator is used to correlate an input SR signal to a SR signal or correlate an input SSB signal to a SSB signal and generate a correlation result accordingly. The SR/SSB lock detector is used to set a lock flag according to the correlation result. The SR/SSB predictor is used to output the SR signal or the SSB signal according to the lock flag. The SR/SSB bit error corrector is used to correct the input SR signal according to the SR signal and the lock flag to generate an output SR signal, or correct the input SSB signal according to the SSB signal and the lock flag to generate an output SSB signal. The SR/SSB detector is used to determine whether the output SR signal or the output SSB signal complies with a predefined standard and generate an indicator signal accordingly.

An embodiment provides an error correction method implemented by a High Definition Multimedia Interface (HDMI) Fixed Rate Link (FRL) system. The system comprises a Scrambler Reset (SR) and Start of Super Block (SSB) correlator, an SR/SSB lock detector coupled to the SR/SSB correlator, an SR/SSB predictor coupled to the SR/SSB lock detector, an SR/SSB bit error corrector coupled to the SR/SSB correlator, the SR/SSB lock detector and the SR/SSB predictor, an SR/SSB detector coupled to the SR/SSB bit error corrector. The method comprises receiving an input SR signal or an input SSB signal by the SR/SSB correlator, correlating the input SR signal to a SR signal or the input SSB signal to a SSB signal to generate a correlation result, setting a lock flag by the SR/SSB lock detector according to the correlation result, when the lock flag is enabled, correcting the input SR signal by the SR/SSB bit error corrector according to the SR signal to generate an output SR signal, or the input SSB signal by the SR/SSB bit error corrector according to the SSB signal to generate an output SSB signal, and determining whether the output SR signal or the output SSB signal complies to a predefined standard by the SR/SSB detector to generate an indicator signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
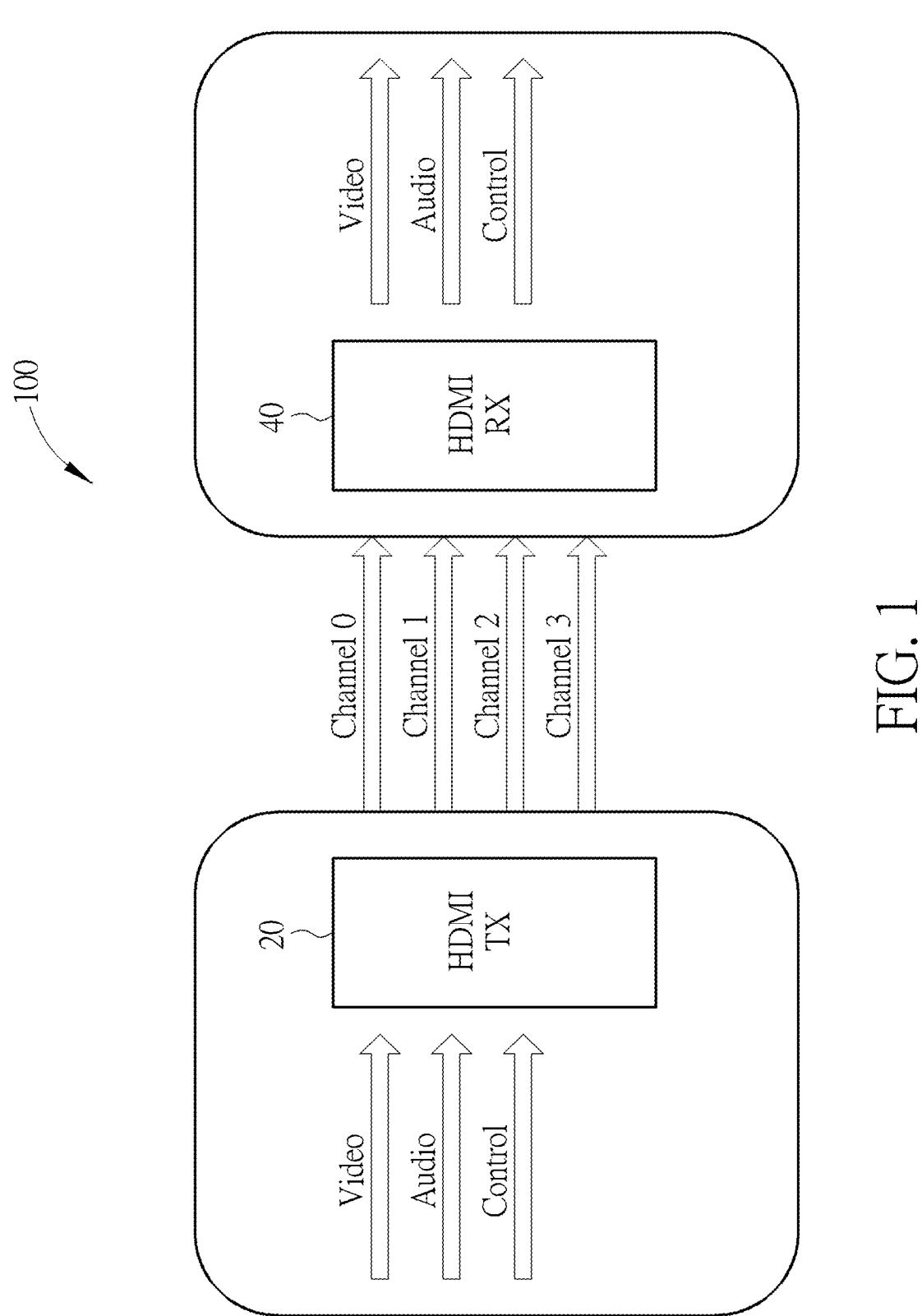
FIG. 1 depicts an embodiment of a HDMI FRL system.

High Definition Multimedia Interface (HDMI) Fixed Rate Link (FRL) was introduced as part of the HDMI 2.1 specification. The key features of HDMI FRL include higher bandwidth, improved compression, enhanced encoding, reduced latency and backward compatibility.

The HDMI FRL synchronization codeword refers to a specific bit pattern or control symbol that is used to achieve and maintain synchronization between the HDMI transmitter and receiver. The synchronization codeword is used to mark the start of a new synchronization sequence, allowing the receiver to align its internal clock and framing with the transmitter. This synchronization initialization is typically performed during the link training process when an HDMI connection is first established. In addition, the synchronization codeword is periodically inserted into the HDMI FRL data stream to maintain ongoing synchronization between the transmitter and receiver, which helps the receiver to continuously track and adjust its clock recovery and framing, ensuring that the data is properly interpreted and decoded. Furthermore, synchronization codeword provides a known reference point in the data stream, allowing the receiver to detect any synchronization errors or data corruption. If synchronization is lost, the receiver can use the synchronization codeword to re-establish synchronization and resume proper data decoding.

Related to the above discussed synchronization codeword, the Scrambler Reset (SR) is a mechanism used to periodically reset the scrambler that is part of the FRL encoding process. The scrambler is responsible for scrambling the data before it is transmitted over the HDMI link, which helps to ensure a more even distribution of the signal levels and clock recovery.

The Scrambler Reset process in HDMI FRL involves the following steps: the transmitter temporarily pauses the data transmission; the state of the scrambler is reset to a known initial state; the data transmission is then resumed, with the scrambler operating from the reset state.

The Scrambler Reset helps to maintain the integrity and reliability of the HDMI FRL link by periodically resynchronizing the scrambler between the transmitter and receiver. It ensures that the scrambling process remains effective and does not introduce any systematic biases or patterns in the transmitted data.

The Start of Super Block (SSB) is a special signaling mechanism used to mark the beginning of a new "super frame" or "super block" in the data transmission. The Start of Super Block serves the following purposes: indicating the start of a new super frame, which includes multiple individual data frames, allowing the receiver to synchronize and align its decoding processes with the transmitter's framing, and signaling the start of a new data stream or a change in the transmission parameters (e.g., resolution, frame rate, color depth). Both SR and SSB are used for codeword boundary detection.

The Scrambler Reset and Start of Super Block (SR/SSB) in HDMI FRL can help maintain the integrity, synchronization, and reliability of the data transmission over the HDMI link, supporting the high-quality delivery of audio and video signals.

The current HDMI specification does not include any protection mechanism for the SR/SSB used in synchronization. If the Signal-to-Noise Ratio (SNR) is relatively low, bit errors would likely to occur, which may cause the system to be falsely synchronized. The TX/RX scramble codes would not be able to correspond synchronously, and there would be a large section of data that cannot be decoded, which would cause obvious interference on the screen, such as black screen, flickering lines, screen jitter, etc. The following detailed description provides a solution to this unaddressed problem.

FIG. 1 depicts an embodiment of a HDMI FRL system 100. The HDMI FRL system 10 includes a HDMI transmitter (TX) 20 and HDMI receiver (RX) 40. The HDMI TX 20 is the source device (e.g., a gaming console, Blu-ray player, or computer) that generates the HDMI signal. The HDMI RX 40 is the receiving end of the system, typically connected to a display (e.g., a television or monitor). The signals are transmitted through four channels (i.e., channel 0 to channel 3). The HDMI FRL system 100 facilitates the transmission of various data streams, including video, audio, and control signals. The HDMI TX 20 sends video data to the HDMI RX 40. The video data includes high-resolution video content (e.g., 4K or 8K). Simultaneously, audio data (such as surround sound or stereo audio) is transmitted from the HDMI TX 20 to the HDMI RX 40. The HDMI FRL system 100 also handles control signals for functions like volume adjustment, power on/off, and input selection. Each channel handles synchronization signals (e.g., SSB and SR) for synchronization between the HDMI TX 20 and the HDMI RX 40. If they are falsely synchronized, the TX/RX scramble codes would not be able to correspond synchronously. As a result, a large section of data cannot be decoded, which would cause obvious interference on the screen, such as black screen, flickering lines, screen jitter, etc. The following detailed description provides a solution to this unaddressed problem.

Figure 2:
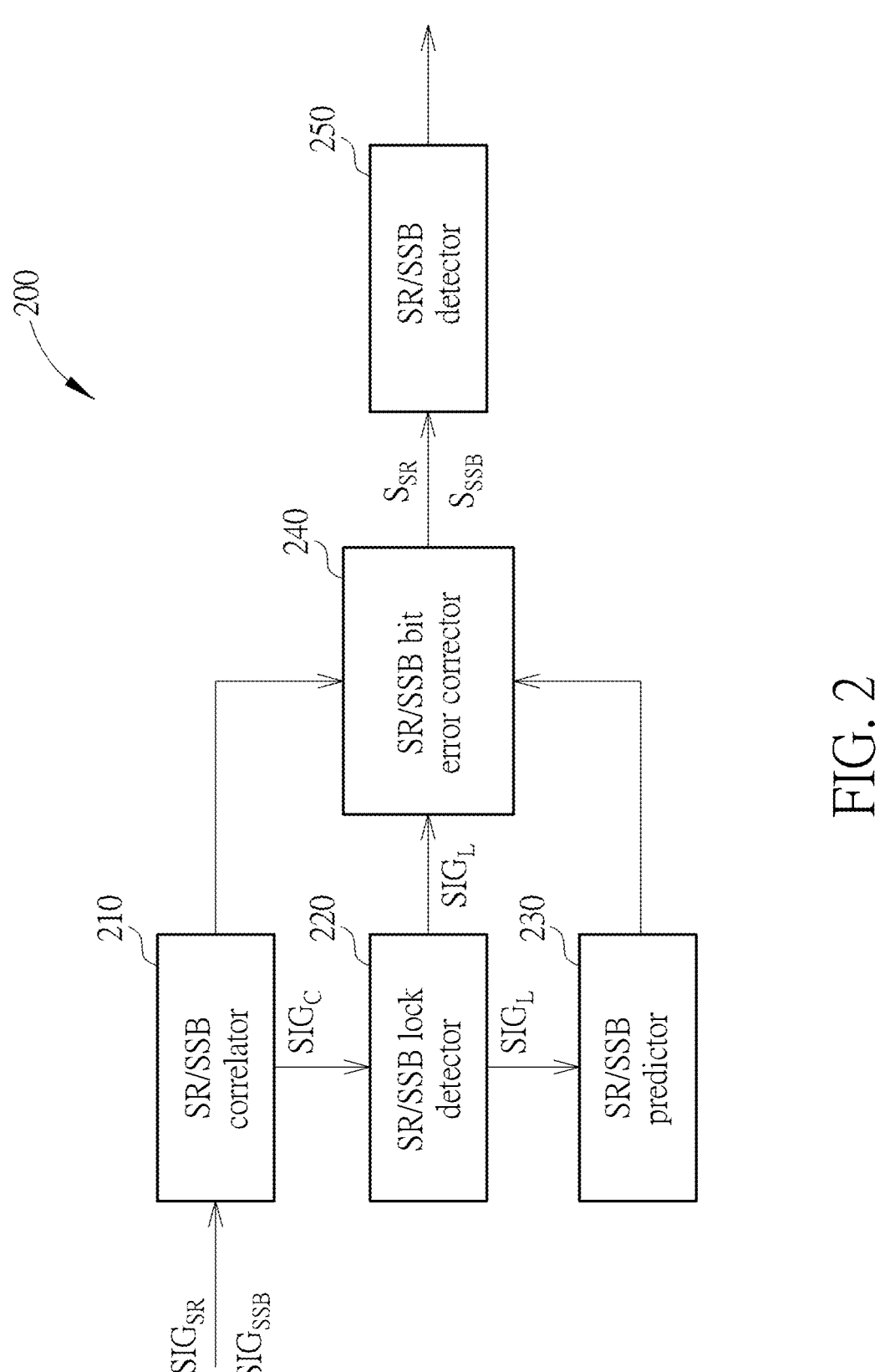
FIG. 2 depicts an embodiment of a HDMI FRL error correction system.

FIG. 2 depicts an embodiment of a HDMI FRL error correction system 200, which is implemented by the HDMI FRL system 210. The HDMI FRL system 200 includes an SR/SSB correlator 210, an SR/SSB lock detector 220 coupled to the SR/SSB correlator 210, an SR/SSB predictor 230 coupled to the SR/SSB lock detector 220, an SR/SSB bit error corrector 240 coupled to the SR/SSB correlator 210, the SR/SSB lock detector 220 and the SR/SSB predictor 230, and an SR/SSB detector 250 coupled to the SR/SSB bit error corrector 240. The SR/SSB correlator 210 is used to correlate an input SR signal $SIG_{SR}$ to a standard SR signal or correlate an input SSB signal $SIG_{SSB}$ to a standard SSB signal and generate a correlation result $SIG_C$ accordingly. The SR/SSB lock detector 220 is used to set a lock flag $SIG_L$ according to the correlation result $SIG_C$. The SR/SSB predictor 230 is used to output the standard SR signal or the standard SSB signal according to the lock flag $SIG_L$. The SR/SSB bit error corrector 240 is used to correct the input SR signal $SIG_{SR}$ according to the standard SR signal and the lock flag $SIG_L$ to generate an output SR signal $S_{SR}$, or correct the input SSB signal $SIG_{SSB}$ according to the standard SSB signal and the lock flag $SIG_L$ to generate an output SSB signal $S_{SSB}$. The SR/SSB detector 250 is used to determine whether the output SR signal $S_{SR}$ or the output SSB signal $S_{SSB}$ complies to a predefined standard and generate an indicator signal accordingly.

Figure 3:
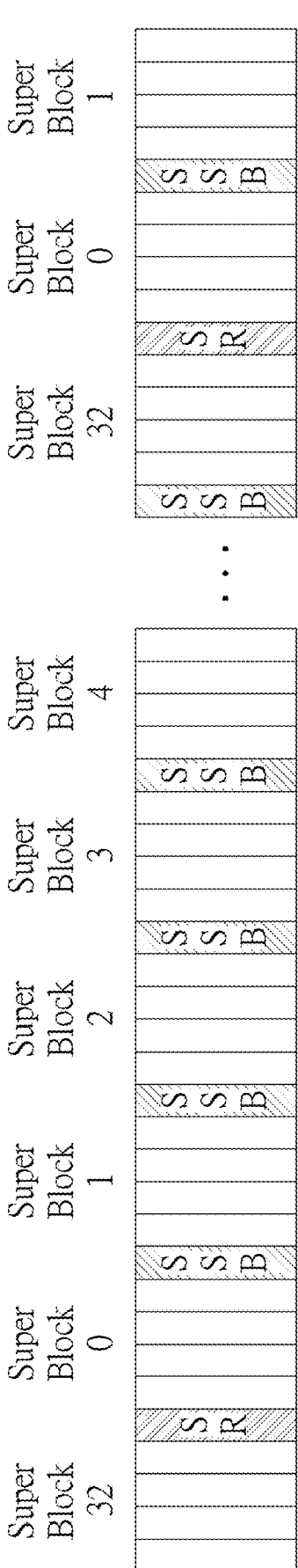
FIG. 3 depicts an embodiment of HDMI FRL synchronization signal.

FIG. 3 depicts an embodiment of HDMI FRL synchronization signal. As shown in FIG. 3, SSB refers to the start of the superblock in synchronization, and SR refers to the start of every 33 superblocks in synchronization and scramble code reset. Both SR and SSB are used for word boundary detection.

According to the current HDMI specification, the standard SR signal may include codewords 110000000100011110, 011110001000000011, 001111111011100001, and 100001110111111100, and the standard SSB signal may include codewords 110000000100010111, 111010001000000011, 001111111011101000 and 000101110111111100.

The synchronization signal (which includes SR signal $SIG_{SR}$ and the SSB signal $SIG_{SSB}$) is a bit stream (e.g., . . . 001100110000000100011110000011111). Hence, the SR signal $SIG_{SR}$ can be correlated to the standard SR signal by sliding window mapping. The same applies to the SSB signal $SIG_{SSB}$. The SSB signal $SIG_{SSB}$ can also be correlated to the standard SSB signal by sliding window mapping.

Figure 4:
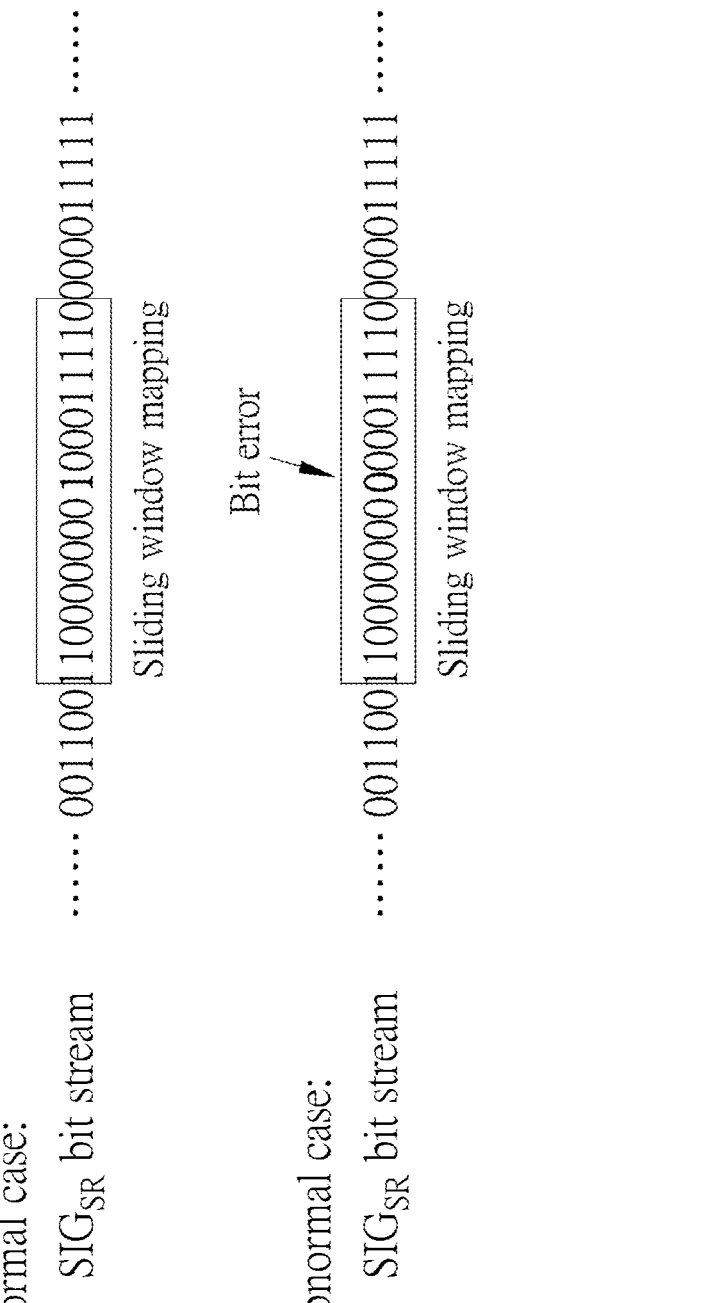
FIG. 4 depicts an embodiment of HDMI FRL SR/SSB correlation.

FIG. 4 depicts an embodiment of HDMI FRL SR/SSB correlation. In a normal case, the SR codeword 110000000100011110 is found in a bit stream by sliding window mapping. At this time, the scramble seed can be reset for codeword synchronization. In contrast, with an abnormal case, a "1" in the SR codeword may be erroneously changed to a "0", thus, the SR codeword is not found by sliding window mapping. Thus, the scramble seed cannot be reset for codeword synchronization. This may cause synchronization error.

The above mechanism can be executed by the SR/SSB correlator 210. When the synchronization signals (which include signals $SIG_{SR}$ and $SIG_{SSB}$) come into the HDMI FRL error correction system 200, the SR/SSB correlator 210 may use sliding window mapping to compare the received signals $SIG_{SR}$ or $SIG_{SSB}$ with the standard SR signal or the standard SSB signal respectively, and calculate the similarity between the received signal $SIG_{SR}$ or $SIG_{SSB}$ and the standard SR signal or the standard SSB signal. Then, the SR/SSB correlator 210 can output the correlation result $SIG_C$.

It should be noted that SR/SSB correlator 210 performs cross-correlation. It is to compare two different signals and calculates how similar one signal is to a time-shifted version of the other. It can be performed by sliding one signal over the other (sliding window) and calculating how well their values line up at each position. A high correlation value indicates a strong similarity between the signals, while a low value suggests the signals are not very alike.

If the correlation result $SIG_C$ shows an error rate is lower than a predetermined limit, that is, high correlation value, (i.e., there are few or no error bits), the lock flag $SIG_L$ is enabled by the SR/SSB lock detector 220 and be sent to the SR/SSB predictor 230.

The SR/SSB lock detector 220 operates in two modes depending on the severity of the error. When the error is minimal, the detector locks the system and uses a standard pattern and codeword from the database for correction. However, when the number of errors exceeds the limit, according to the HDMI specification, the detector unlocks the system by turning off the lock flag and allowing the error pattern to propagate to the backend without using the standard codeword for correction, enabling the detection of the unlocked condition.

The SR signal $SIG_{SR}$ and the SSB signal $SIG_{SSB}$ are periodic signals. When the SR/SSB lock detector 220 sends the lock flag $SIG_L$ to the SR/SSB predictor 230, the SR/SSB predictor 230 can generate the standard SR signal or the standard SSB signal and send it to the SR/SSB bit error corrector 240. When receiving the lock flag $SIG_L$ from the SR/SSB lock detector 220 and the standard SR signal from the SR/SSB predictor 230, the SR/SSB bit error corrector 240 can use the standard SR codeword comprised in the standard SR signal to correct the erroneous codeword (i.e., replacing the SR signal $SIG_{SR}$ with the standard SR signal) in the synchronization signal at the position of SR of the bit stream. The corrected codeword (i.e., the output SR signal $S_{SR}$) is then sent to the subsequent SR/SSB detector 250. If the lock flag $SIG_L$ is not sent by the SR/SSB lock detector 220, the SR/SSB bit error corrector 240 can allow the SR signal $SIG_{SR}$ to pass through directly to the subsequent SR/SSB detector 250 without any modification.

The same procedure applies to the SSB signal $SIG_{SSB}$, and the description is not repeated herein.

The SR/SSB detector 250 can detect whether the output SR signal $S_{SR}$ or the output SSB signal $S_{SSB}$ meets the HDMI specification. If the output SR signal $S_{SR}$ or output SSB $S_{SSB}$ meets the HDMI specification, the SR/SSB detector 250 would send the indicator signal indicating "channel in time". If the output SR signal $S_{SR}$ or output SSB $S_{SSB}$ does not meet the HDMI specification, the SR/SSB detector 250 would send the indicator signal indicating "channel lose time". The subsequence circuits and/or modules can then handle the situation accordingly.

Figure 5:
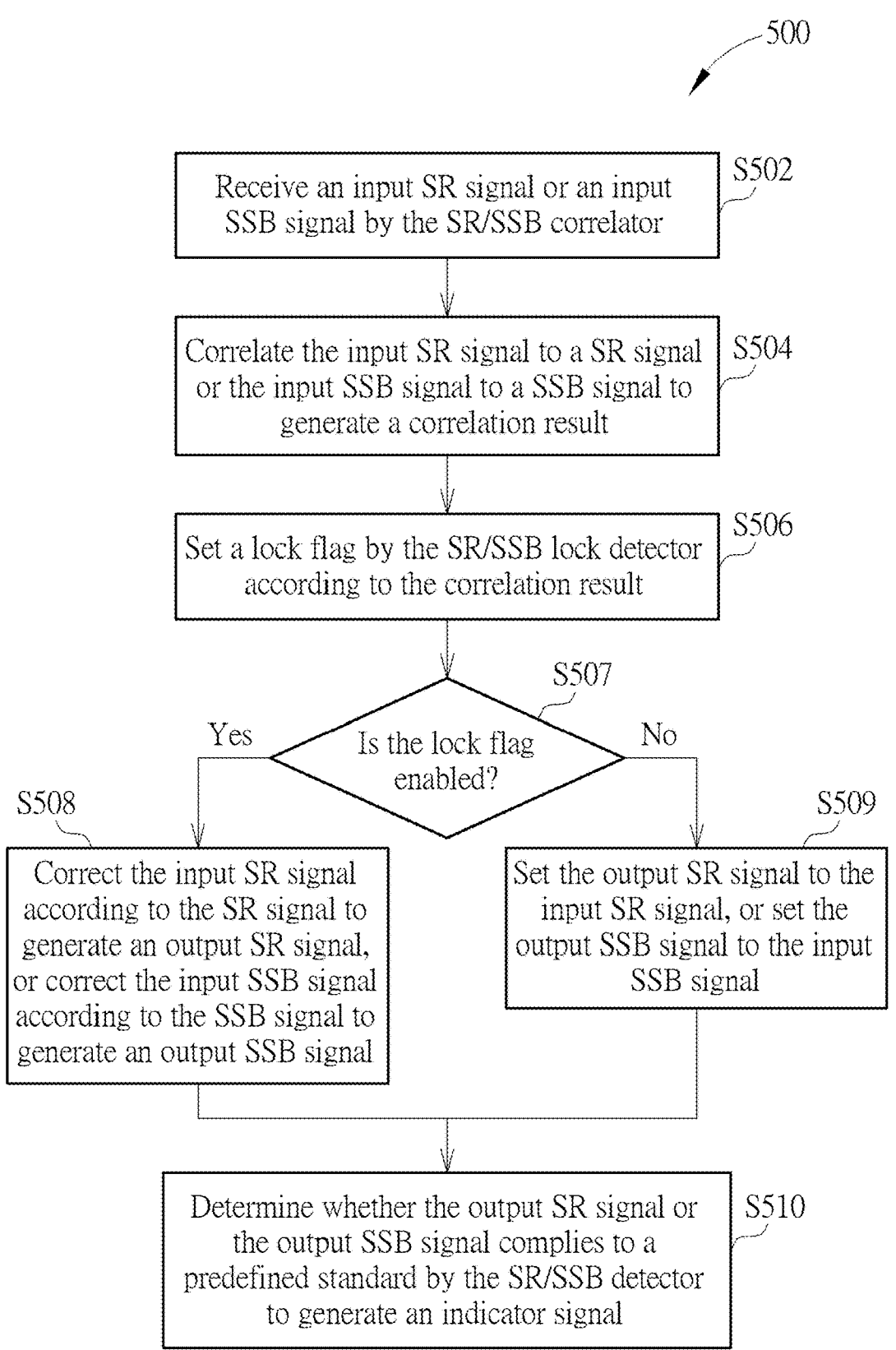
FIG. 5 depicts a flowchart of an error correction method implemented by the HDMI FRL error correction system of FIG. 2.

FIG. 5 depicts a flowchart of an error correction method 500 implemented by the HDMI FRL error correction system 200. The error correction method 500 includes the following steps:

S502: Receive an input SR signal $SIG_{SR}$ or an input SSB signal $SIG_{SSB}$ by the SR/SSB correlator 210;

S504: Correlate the input SR signal $SIG_{SR}$ to a SR signal or the input SSB signal $SIG_{SSB}$ to a SSB signal to generate a correlation result $SIG_C$;

S506: Set a lock flag $SIG_L$ by the SR/SSB lock detector 220 according to the correlation result $SIG_C$;

S507: Is the lock flag $SIG_L$ enabled or disabled? If enabled, go to step S508; else go to step S509;

S508: Correct the input SR signal SIGSR according to the SR signal to generate an output SR signal SSR, or correct the input SSB signal SIGSSB according to the SSB signal to generate an output SSB signal SSSB; go to step S510;

S509: Set the output SR signal SSR to the input SR signal SIGSR, or set the output SSB signal SSSB to the input SSB signal SIGSSB; go to step S510; and S510: Determine whether the output SR signal SSR or the output SSB SSSB signal complies to a predefined standard by the SR/SSB detector 250 to generate an indicator signal.

This specification describes embodiments that address the potential for channel desynchronization, thereby mitigating the risk of interference on the HDMI receiving device, including black screens, flickering lines, and screen jitter. While the existing HDMI specification lacks forward error correction (FEC) protection for SR/SSB signals, the proposed solution offers the capability to rectify bit errors arising from noise or external interference. Consequently, both the SR/SSB signals and the accompanying HDMI signal can be corrected, enhancing transmission reliability.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wire or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

The various illustrative components, logic, logical blocks, modules, circuits, operations and algorithm processes described in connection with the embodiments disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single-chip processor or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some embodiments, particular processes, operations and methods may be performed by circuitry that is specific to a given function.

As described above, in some aspects embodiments of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the embodiments described in this disclosure may be readily apparent to persons having ordinary skill in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein.

While some embodiments comprise the disclosed features and may therefore include additional features not specifically described, other embodiments may be essentially free of or completely free of non-disclosed elements. That is, non-disclosed elements may optionally be essentially omitted or completely omitted.

Additionally, various features that are described in this specification in the context of separate embodiments also can be implemented in combination in a single implementation. Conversely, various features that are described in the context of a single implementation also can be implemented in multiple embodiments separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described should not be understood as requiring such separation in all embodiments, and it should be understood that the described program components and systems can generally be integrated together in single software or packaged into multiple software. Additionally, other embodiments are within the scope of the following claims. In some cases, the actions recited in the claims can be performed in a different order and still achieve desirable results.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A High Definition Multimedia Interface (HDMI) Fixed Rate Link (FRL) error correction system comprising:
    a Scrambler Reset (SR) and Start of Super Block (SSB) (SR/SSB) correlator configured to correlate an input SR signal to a SR signal or correlate an input SSB signal to a SSB signal and generate a correlation result accordingly;
    an SR/SSB lock detector coupled to the SR/SSB correlator, configured to set a lock flag according to the correlation result;
    an SR/SSB predictor coupled to the SR/SSB lock detector, configured to output the SR signal or the standard SSB signal according to the lock flag;
    an SR/SSB bit error corrector coupled to the SR/SSB correlator, the SR/SSB lock detector and the SR/SSB predictor, configured to correct the input SR signal according to the SR signal and the lock flag to generate an output SR signal, or correct the input SSB signal according to the standard SSB signal and the lock flag to generate an output SSB signal; and
    an SR/SSB detector coupled to the SR/SSB bit error corrector, configured to determine whether the output SR signal or the output SSB signal complies with a predefined standard and generate an indicator signal accordingly.

2. The HDMI FRL error correction system of claim 1, wherein the input SR signal is correlated to the standard SR signal by a sliding window.

3. The HDMI FRL error correction system of claim 1, wherein the input SSB signal is correlated to the SSB signal by a sliding window.

4. The HDMI FRL error correction system of claim 1, wherein the lock flag is enabled if the correlation result shows an error rate is lower than a predetermined limit.

5. The HDMI FRL error correction system of claim 1, wherein if the lock flag is enabled, the output SR signal is the SR signal, or the output SSB signal is the SSB signal.

6. The HDMI FRL error correction system of claim 1, wherein if the lock flag is disabled, the output SR signal is the input SR signal, or the output SSB signal is the input SSB signal.

7. An error correction method implemented by a High Definition Multimedia Interface (HDMI) Fixed Rate Link (FRL) system, the system comprising a Scrambler Reset (SR) and Start of Super Block (SSB) correlator, an SR/SSB lock detector coupled to the SR/SSB correlator, an SR/SSB predictor coupled to the SR/SSB lock detector, an SR/SSB bit error corrector coupled to the SR/SSB correlator, the SR/SSB lock detector and the SR/SSB predictor, an SR/SSB detector coupled to the SR/SSB bit error corrector, the method comprising:

receiving an input SR signal or an input SSB signal by the SR/SSB correlator;

correlating the input SR signal to a SR signal or the input SSB signal to a SSB signal to generate a correlation result;

setting a lock flag by the SR/SSB lock detector according to the correlation result;

when the lock flag is enabled, correcting the input SR signal by the SR/SSB bit error corrector according to the SR signal to generate an output SR signal, or correcting the input SSB signal by the SR/SSB bit error corrector according to the SSB signal to generate an output SSB signal; and determining whether the output SR signal or the output SSB signal complies with a predefined standard by the SR/SSB detector to generate an indicator signal.

8. The method of claim 7, wherein correcting the input SR signal by the SR/SSB bit error corrector according to the SR signal to generate the output SR signal is setting the output SR signal to the SR signal, and correcting the input SSB signal by the SR/SSB bit error corrector according to the SSB signal to generate the output SSB signal is setting the output SSB signal to the SSB signal.

9. The method of claim 7, further comprising when the lock flag is disabled, setting the output SR signal to the input SR signal, or setting the output SSB signal to the input SSB signal.

10. The method of claim 7, wherein the input SR signal is correlated to the SR signal by a sliding window.

11. The method of claim 7, wherein the input SSB signal is correlated to the SSB signal by a sliding window.

12. The method of claim 7, further comprising enabling the lock flag if the correction result shows an error rate is lower than a predetermined limit.

* * * * *